United States Patent
Kotaba et al.

(10) Patent No.: US 9,091,553 B2
(45) Date of Patent: Jul. 28, 2015

(54) SYSTEMS AND METHODS FOR MATCHING SCENES USING MUTUAL RELATIONS BETWEEN FEATURES

(75) Inventors: Ondrej Kotaba, Orlova (CZ); Jan Lukas, Melnik (CZ)

(73) Assignee: Honeywell International Inc., Morristown, NJ (US)

(*) Notice: Subject to any disclaimer, the term of this patent is extended or adjusted under 35 U.S.C. 154(b) by 1045 days.

(21) Appl. No.: 12/644,559

(22) Filed: Dec. 22, 2009

(65) Prior Publication Data

US 2011/0153206 A1    Jun. 23, 2011

(51) Int. Cl.
| | |
|---|---|
| G01C 21/30 | (2006.01) |
| G01C 21/32 | (2006.01) |
| G06K 9/46 | (2006.01) |
| G06T 17/00 | (2006.01) |
| G01C 21/00 | (2006.01) |
| G06T 7/00 | (2006.01) |

(52) U.S. Cl.
CPC ............... *G01C 21/32* (2013.01); *G01C 21/00* (2013.01); *G06K 9/46* (2013.01); *G06T 7/0028* (2013.01); *G06T 7/0034* (2013.01); *G06T 7/0044* (2013.01); *G06T 17/00* (2013.01); *G06T 2207/30252* (2013.01)

(58) Field of Classification Search
USPC ........... 701/208, 527; 345/419, 420; 348/113, 348/208.4, 308, 218.1; 382/106, 124, 154, 382/173, 181, 209, 218, 305, 100, 113, 153, 382/128; 600/407; 700/83; 703/7; 705/14.58
See application file for complete search history.

(56) References Cited

U.S. PATENT DOCUMENTS

| | | | |
|---|---|---|---|
| 2005/0069173 A1 | 3/2005 | Morisada et al. | |
| 2006/0088203 A1* | 4/2006 | Boca et al. | 382/153 |
| 2006/0204079 A1* | 9/2006 | Yamaguchi | 382/154 |
| 2006/0221072 A1* | 10/2006 | Se et al. | 345/420 |
| 2009/0262206 A1* | 10/2009 | Park | 348/218.1 |

OTHER PUBLICATIONS

Wu et al., "3D Model Matching With Viewpoint-Invariant Patches (VIP)", "2008 IEEE Conference on Computer Vision and Patten Recognition", Jun. 23-28, 2008, pp. 1-8.
Goshtasby et al., "Point Pattern Matching Using Convex Hull Edges", "IEEE Transctions on Systems, Man, and Cybernetics", Sep./Oct. 1985, pp. 631-637, vol. 15, No. 5.
R. Hartley, "In Defense of the Eight-Point Algorithm", "IEEE Transactions on Pattern Analysis and Machine Intelligence", Jun. 1997, pp. 580-593, vol. 19, No. 6, Publisher: IEEE.

(Continued)

*Primary Examiner* — Tuan C. To
*Assistant Examiner* — Isaac Smith
(74) *Attorney, Agent, or Firm* — Fogg & Powers LLC

(57) ABSTRACT

Embodiments of the present invention provide improved systems and methods for matching scenes. In one embodiment, a processor for implementing robust feature matching between images comprises: a first process for extracting a first feature set from a first image projection and extracting a second feature set from a second image projection; a memory for storing the first feature set and the second feature set; and a second process for feature matching using invariant mutual relations between features of the first feature set and the second feature set; wherein the second feature set is selected from the second image projection based on the identification of similar descriptive subsets between the second image projection and the first image projection.

9 Claims, 3 Drawing Sheets

(56) References Cited

OTHER PUBLICATIONS

Horn et al., "Closed-Form Solution of Absolute Orientation Using Unit Quaternions", "Journal of the Optical Society of America", Apr. 1987, pp. 629-642, vol. 4, Publisher: Optical Society of America.

Irschara et al., "From Structure-From-Motion Point Clouds to Fast Location Recognition", "IEEE Computer Society Conference on Computer Vision and Pattern Recognition", Apr. 18, 2009.

Jean et al., "Trajectories Normalization for Viewpoint Invariant Gait Recognition", Dec. 8-11, 2008.

Nister, David, "An Efficient Solution to the Five-Point Relative Pose Problem", "Pattern Analysis and Machine Intelligence", Jun. 2004, vol. 26, No. 6, Publisher: IEEE.

Vedaldi et al., "On Viewpoint Invariance for Non-Planar Scenes", "UCLA CSD Technical Report #TR050012", Mar. 3, 2006, pp. 1-22.

European Patent Office, European Search Report, Apr. 15, 2011, Published in: EP.

Rodrigo et al., "Robust and Efficient Feature Tracking for Indoor Navigation", "IEEE Transactions on Systems. Man.and Cybernetics—Part B: Cybernetics", Jun. 2009, pp. 658-671, vol. 39, No. 3, Publisher: IEEE.

* cited by examiner

SYSTEMS AND METHODS FOR MATCHING SCENES USING MUTUAL RELATIONS BETWEEN FEATURES

BACKGROUND

Typical approaches for matching objects from different images are typically descriptor based. That is, they are designed to detect things containing sufficient information to be considered interesting and unique within the scene. From any such object, features are extracted which allow calculation of a description vector that contains sufficient information to identify the object within the scene. The particular description vectors are selected to be invariant to expected transformations of the scene. That is, for an expected transformation, the derived description vector should remain a valid representation for describing the object, despite the transformation. One fundamental problem with the description vector approach is that to design a description vector that fulfills some desired properties, other must be given up. For example, it is not possible to produce a description vector that is generically invariant to all transformations. Instead, you must choose a particular set of transformations that you want to be invariant to. The more generic the description vector becomes, a greater number of objects in the scene will appear similar. This weakens the ability of a description vector to uniquely describe a single object. The more generic the description vector, the less descriptive it becomes. The design of the description vector must therefore be tuned to a specific situation, rendering its usefulness very limited in other situations. There are cases, thought, when descriptor based methods cannot be used. Other approaches using relational matching techniques as opposed to description vectors have been proposed. To date however, approaches using relational matching techniques have been limited in their ability to reliably handle three-dimensional real world scenes.

For the reasons stated above and for other reasons stated below which will become apparent to those skilled in the art upon reading and understanding the specification, there is a need in the art for improved systems and methods for matching scenes.

SUMMARY

The Embodiments of the present invention provide methods and systems for matching scenes using mutual relations between features and will be understood by reading and studying the following specification.

Embodiments of the present invention provide improved systems and methods for matching scenes. In one embodiment, a processor for implementing robust feature matching between images comprises: a first process for extracting a first feature set from a first image projection and extracting a second feature set from a second image projection; a memory for storing the first feature set and the second feature set; and a second process for feature matching using invariant mutual relations between features of the first feature set and the second feature set; wherein the second feature set is selected from the second image projection based on the identification of similar descriptive subsets between the second image projection and the first image projection.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

Figure 1:
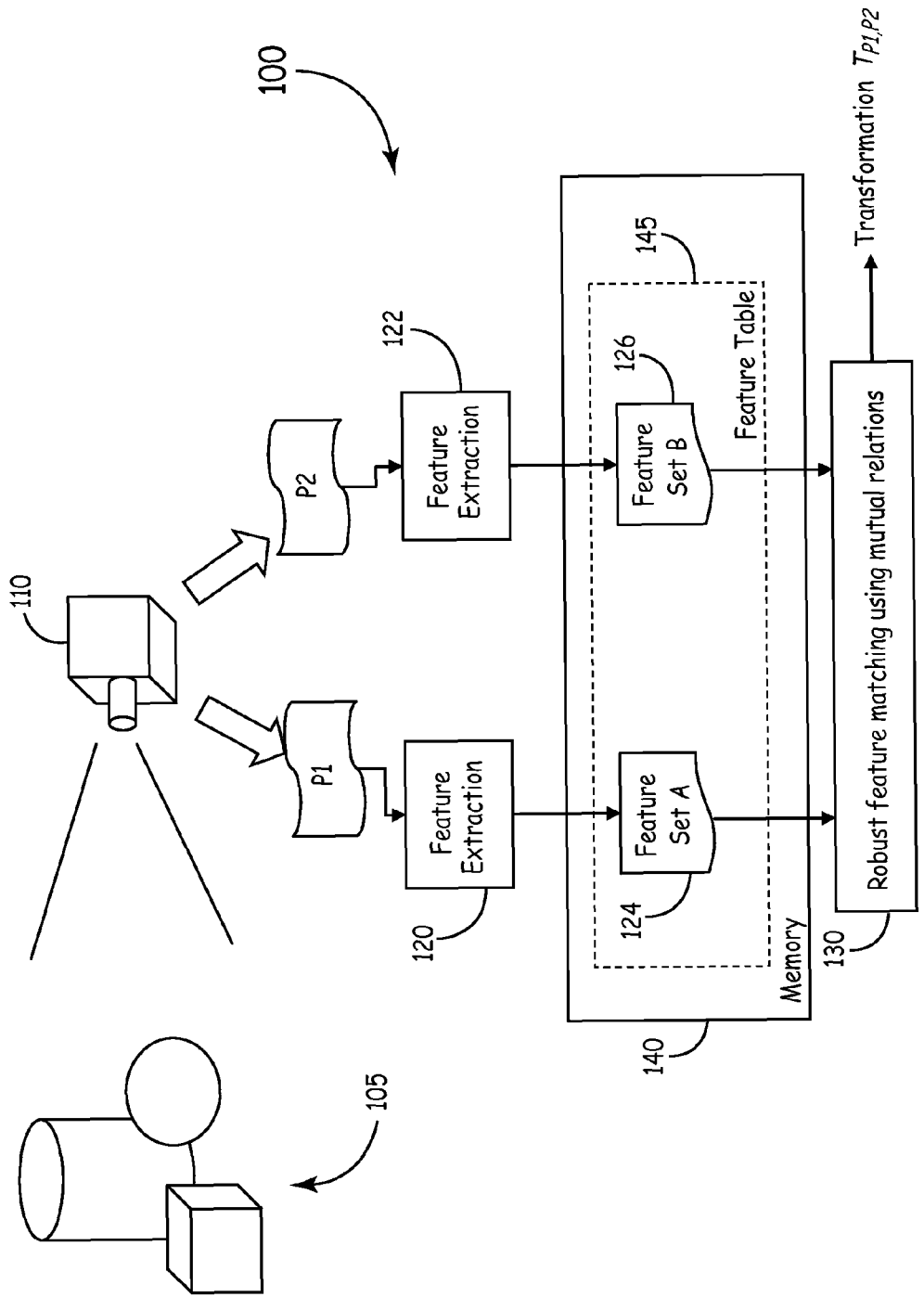
FIG. 1 is a block diagram illustrating projection matching using mutual relations of one embodiment of the present invention.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide systems and methods for matching different projections of a real world scene using a concept referred to herein as the matching of mutual relations between features rather than description vectors that describe the features. Mutual relations suitable for matching may be defined between features that are mutually static over the time in chosen reference frame. For example, when a sensor captures a scene and produces a 3-dimentional projection of the scene (such as a point cloud captured by Light Detection and Ranging (LIDAR) technology device) one mutual relation would be a distance between any two mutually stable points in the projection. That is, a mutual relation will represent a difference in a physical or tangible property with respect to objects in the scene. Sets of mutual relations are then used to determine how objects (or features of objects) are positioned with respect to each other. This is in contrast to the description vector, which only describes how the objects look. For example, a distance between a corner of one object and a corner of another object would represent one mutual relation with respect to those two objects. Differences in temperature indicated by a thermal image of a scene would be a basis for defining a mutual relation between features in another embodiment as could be features such as reflectance and color in still other embodiments. Further, sets of mutual relations may be based on features such as, but not limited to, distances, areas, angles, solid angles, volumes, generalized areas or volumes to higher dimensions, central moments or a histogram. For example, in one embodiment a set of features includes planar features with the angles between normal vectors of the planar features as invariant relations.

Which mutual relations to use in a given application is situation specific for the anticipated transformation that will be applied to capture images and generate the projection. For example, when a LIDAR sensor scans a scene, it generates a 3-dimentional point cloud projection of that scene. When two projections are obtained of a single scene from two different places using LIDAR, the resulting transformation will differ in rotation and translation, but not scale. A camera type image capturing device, in comparison, produces a 2-dimentional image. The 2-dimentional image represents a projection of the scene onto a plane. The projection of the same scene captured twice from different places using a camera will differ—the 3D to 2D projection has infinite number of possibilities and some or all of the features extracted from such projection will differ in shape, size and need not be present in some of the projections at all due to occlusions.

Accordingly, the nature of any property chosen for matching mutual relations of features must consider the transformation applied by the particular sensor used. In addition, the characteristics of the particular situation in which images are being captured must be considered. For example, if you know that your LIDAR sensor is not rotating and is always facing the same direction, you may anticipate that a property such as a difference in object altitude from the ground may form the basis for a mutual relation between objects, as well as a distance between the objects. As long as the property is invariant (i.e., agnostic) to the transformation applied, then that property may be used for matching mutual relations using embodiments of the present invention. Accordingly, embodiments of the present invention are not limited to matching 2 dimensional or 3-dimensional projections using cameras and LIDAR sensors. In fact, sensors providing transformations into 1 dimension, 4 dimensions, 5 dimensions, or greater are anticipated as within the scope of embodiments of the present invention.

FIG. 1 is a block diagram illustrating projection matching using mutual relations of one embodiment of the present invention shown generally at 100. An image capturing device 110 captures a first projection (P1) of a real world scene 105. Either at a subsequent point in time or from a different location, image capturing device 110 captures a second projection (P2) the real world scene at 102. Because image capturing device 110 might have moved from the between capturing P1 and P2, these respective projections are assumed to represent different views of real world scene 105.

For projection P1, a feature extraction at 120 extracts features of interest that appear in the projection P1 to form feature set A. Similarly, feature extraction at 122 extracts features of interest that appear in the projection P2 to form feature set B. For example, for 2-dimentional photographic image projections, features of interest may include objects and surfaces such as floors, walls, corners, curved or linear edges of objects, and the like. Defining characteristics of any physical object may be extracted as a feature from a projection. For 3-dimentional LIDAR produced projections, points of a point cloud projection can be defined as features. Alternatively, lines, curves or planes defined by points within the point cloud can also be defined as extractable features for form set A and set B.

Robust feature matching using mutual relations is applied to the features of set A and the features of set B at 130. Unlike matching available in the prior art, robust feature matching at 130 identifies corresponding features from set A that appear in set B using mutual relations between features contained in feature sets A and B. From the features of set A and the features of set B, it is possible to determine how the image capturing device 110 moved from the time it captured P1 to the time it captured P2. The minimum number of features sufficient from each projection P1 and P2 to define the respective transformation associated with the movement of image capturing device 110 is referred to herein as the "minimal subset". Accordingly, each minimal subset defined for set A includes at least a number n of features from set A where n is based on the number of mutual relations that are mathematically necessary to calculate a transformation between the two projections P1 and P2. This number n is a function of both the particular type of projection utilized by the image capturing device, and the known physical dynamics affecting the image capturing device. In addition, the number n for forming a minimal subset may depend on the type of mutual property that will be used for matching. For example, in the one embodiment where the set of features includes planar features with the angles between normal vectors of the planar features as invariant relations, the number n for forming a minimal subset would be three.

As would be appreciated by one of ordinary skill in the art upon studying this specification, different image sensors technologies will apply different projection transformations to a real world scene. For example, a camera typically projects a real world scene onto a 2-dimentional planar surface. A LIDAR scan projects the same real world scene as a point-cloud into a 3-dimentional space. The particular image sensors technology used by image capturing device 110 at least partially determines how many features are sufficient to define a minimal subset. For example, in the case of the 3-dimentional projection produced by a LIDAR, when 3 features are identified in a projection P1, and the same 3 features can be identified in projection P1, it is possible to use knowledge of the locations of the features (in two distinct camera reference frames) to determine how the LIDAR moved. That is, a pair of 3-point subsets from set A and set B (each point being a feature, for example) is sufficient to estimate a transformation that explains the difference between P1 and P2. In contrast, for an image capturing device that generates 2-dimensional projections onto a plane, a subset of at least 5 features is sufficient. That is, 5 features in the projection P1 that corresponds to 5 features in projection P1 are sufficient to estimate the transformation undergone, or a finite number of its hypotheses.

Physical dynamics affecting image capturing device 110 also play a factor in determining n. For example, in one embodiment the number of extracted features sufficient to form a minimal subset may be reduced if it is known that rotation of the image capture device 110 is not possible. Alternatively, the number of extracted features sufficient to form a minimal subset may be reduced if it is known that the image capture device 110 produces projections that are invariant to scaling or some other effect. The number n of features to include in a minimal subset for a particular application are readily determined by one of ordinary skill in the art upon reading this specification using their knowledge of the particular transformation utilized by the sensor they plan to use and the anticipated application for which the sensor will be used. Utilization of more than n features to form subsets is also contemplated as within embodiments of the present invention. In that case, the term "descriptive subset" is used herein and defined as a subset that contains at least a minimal subset of n features.

In operation, robust feature matching between projections P1 and P2, using mutual relations between features is achieved as follows: Given the set A of features derived from projection 1 (P1), and the set B of features derived from projection 2 (P2), a transformation T will exist between the projections P1 and P2 that is defined, often in an over-determined system, by feature set A and set B. A family of minimal subsets of features c belonging to P1, and a family of minimal subsets of features d belonging to P2 form what is referred to herein as a family of feature pairs ([c{1}, d{1}], [c{2}, d{2}], [c{3}, d{3}] . . . [c{n},d{n}]). In other words, [c{1}, d{1}] . . . up to [c{n}, d{n}] include all minimal subsets of A and B respectively, belonging to the projections P1 and P2 that define a transformation T between P1 and P2. For example, in one embodiment 50 to 60 minimal subsets are obtained coming from set A and set B, that belong to projection P1 and projection P2. Together they are used to define the transformation T. Mutual relations between features is the technology described herein that determines which feature d{q} from d most likely corresponds with a particular feature c{p} from c. A process of one embodiment of the present invention is described in FIG. 2.

Figure 2:
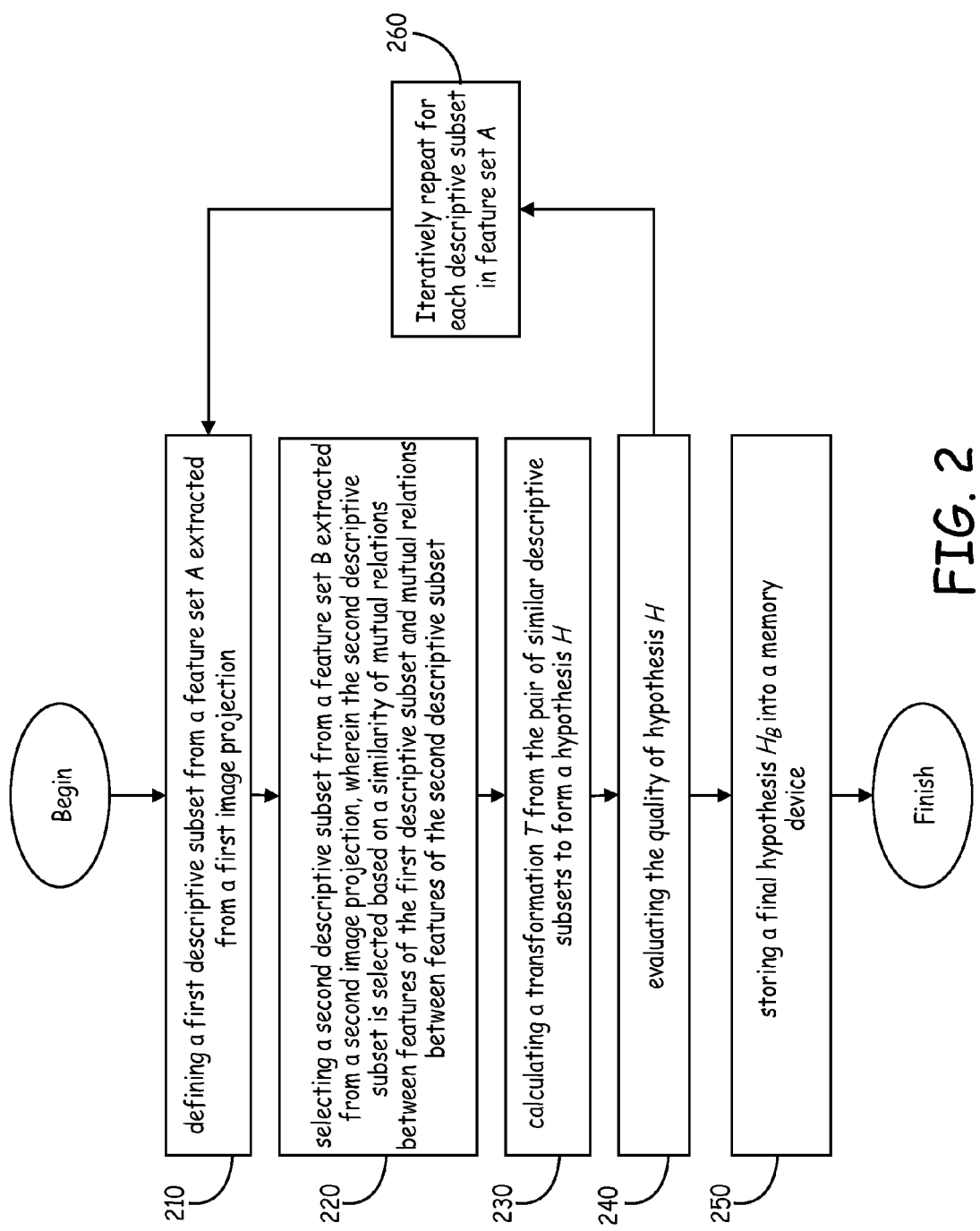
FIG. 2 is a flow chart illustrating a process for robust feature matching using mutual relations between features of one embodiment of the present invention.

FIG. 2 illustrates a process for robust feature matching using mutual relations between features of one embodiment of the present invention. The process begins at 210 with defining a first descriptive subset ($c_{s1}$) from a feature set A extracted from a first image projection. In one embodiment, the descriptive subset $c_{s1}$ is chosen randomly from all the extracted features available for the first image projection in feature set A. In another embodiment, descriptive subset $c_{s1}$ is chosen based on a predefined pattern or a non-uniform random distribution that favors desired properties. For example in one embodiment, a descriptive subset $c_{s1}$ is selected to include three feature points that are not collinear. This will avoid defining descriptive subsets that provide singular solutions. Further, in one embodiment descriptive subset $c_{s1}$ is selected to avoid defining a subset having features that are close together relative to other available features in the projection to avoid solutions sensitive to noise. In one embodiment, selection of a descriptive feature subset is achieved by a random, pseudorandom, quasi-random or any deterministic process, including a setup where a check for the set suitability is included.

In another embodiment, to aid in the selection of features for minimal subset $c_{s1}$, mutual relations between features are optionally pre-processed, pre-sorted, or indexed. For example, referring back to FIG. 1, in one embodiment, after feature sets A and B are extracted from projections P1 and P2, one or both are saved as a feature table 145 in a memory 210

In one embodiment, the feature table 145 is optionally sorted so that the mutual relations representing the greatest differential for a selected characteristic appear first in the table. In another embodiment, the feature table 145 is sorted so that sequential sets of features for set A and/or set B are not collinear. Thus, in one embodiment, selecting the first minimal subset $c_{s1}$ of features from the first image projection simply comprises sequentially selecting features starting from the top of feature table 145. Using this approach, those minimal subsets most likely to produce accurate solutions with the least noise will be used first. In certain applications, such pre-processing of the mutual relations allows the system to converge at a quality solution more quickly than one based on a pure random selection of features based on a uniform-distribution. In some embodiments, the table of mutual relations is indexed to allow a quick lookup of similar values to speed up the search for the matching minimal subsets. In general, any indexing method used in the database environment may be used.

The process proceeds to 220 with selecting a second descriptive subset ($d_{s1}$) from a feature set B extracted from a second image projection. The features for second descriptive subset $d_{s1}$ are selected so that mutual relations between its features are most similar to the mutual relations between the features of descriptive subset $c_{s1}$. The first and second descriptive subsets are then said to define a pair of descriptive subsets. As used herein, similarity is a measurement of the relation between the features selected above that define the mutual relations between features (for example, distance between features, angles between features, or areas or volumes defined by features). In other words, being similar in the sense used herein means that the pair of descriptive subsets $c_{s1}$ and $d_{s1}$ share approximately the same value for the mutual relation properties that are invariant with respect to the transformation T. More than one relation type may be used. For example, in one embodiment where 3-dimentional point-clouds are being matched, one similarity in the sense use herein is defined by traditional geometric triangle congruency. That is, three points in $c_{s1}$ would each have a mutual relation between them (their distance from each other) that can be used to define three sides of a triangle. In other embodiment, similarity is determined by estimating the variances and/or co-variance of the used invariant properties and using such information to determine the feature correspondences using a statistical test.

Using this information, selecting a corresponding minimal subset from feature set B, in one embodiment, would comprise finding a descriptive subset $d_{s1}$ that defines a triangle having dimensions approximately the same as the triangle defined by $c_{s1}$. In another embodiment, the area of the triangle defined by the minimal subset could be used as a single scalar similarity parameter. That is, an alternative similarity measure for determining a descriptive subset $d_{s1}$ is be based on finding a triangle from the features of set B having an area similar to the area of the triangle defined by descriptive subset $c_{s1}$. Congruency based on other shapes, areas and/or volumes definable from the values held in a descriptive subset can form the basis for determining a similarity of mutual relations.

As would be appreciated by one of ordinary skill in the art upon reading this specification, it is not necessary that an exact match between $c_{s1}$ and $d_{s1}$ must be found. In practice, that will seldom happen. Instead, a value is "close enough" to be considered a match between any descriptive subsets $c_{sx}$ and $d_{sy}$ whose parameters are similar enough to be considered congruent. Multiple means for determining such geometric congruency are known and may be readily applied by one of ordinary skill in the art reading this specification. For that reason, they are not repeated here.

In some circumstances, more than one minimal subset from set B may be found that is congruent to descriptive subset $c_{s1}$. In one embodiment, the descriptive subset that is the most congruent with descriptive subset $c_{s1}$ is selected as descriptive subset C. However, when multiple candidates for $d_{s1}$ meet a given congruency criteria, it is best to consider all of the candidates, each paired with descriptive subset $c_{s1}$ in the process described in FIG. 2. As explained above, pre-filtering all the possible triangles in set B by their area into a lookup table 145 decreases the number of combinations that have to be considered to find a match for descriptive subset $c_{s1}$. Matching based on a mutual relation such as point distances involves more calculation and in some embodiments, it is therefore performed on the pre-filtered data set known to already fulfill the simpler—scalar—relation similarity.

The method proceeds to 230 with calculating a transformation T from the pair of similar descriptive subsets chosen above to form a hypothesis H. For example, for the descriptive subset pair $c_{s1}$ and $d_{s1}$ determined above, the transformation T forms the basis for a hypothesis H{$c_{s1}$}, In one embodiment, using the properties used to determine similarity, transformation T is calculated using a method derived from the specific situation. As would be appreciated by one of ordinary skill in the art upon reading this specification, the transformation derived is not necessarily a linear operation, but may also be a combination of several linear operations (rotation+translation), for example. In some cases, it may be linear but in the general case a linear operation is not necessarily expected. As would be appreciated by one of ordinary skill in the art upon studying this specification, there are several methods known for calculating a transformation T from the pair of similar minimal subsets chosen above to form the hypothesis H. References that describe such calculations include: D. Nistér, *An efficient solution to the five-point relative pose problem*, IEEE Transactions on Pattern Analysis and Machine Intelligence (PAMI), 26(6):756-770, June 2004; Hartley, R. I., *In defence of the 8-point algorithm, proceedings*, Fifth International Conference on Computer Vision, 1064-1070, June 1995; and Horn, Berthold K. P., *Closed-form solution of absolute orientation using unit quaternions*, Journal of the Optical Society of America A, Vol. 4, page 629, April 1987, which are each incorporated herein by reference.

Solving for transformation T forms the basis for a first hypothesis H. That is, H describes a hypothesis that describes movement of the image capturing sensor 110 between the capture of projections P1 and P2, along with the two sets of data that support this transformation hypothesis, as described below. When an estimate $c_{sp}'$ is calculated using the hypothetic transformation (for example, $c_{sp}'=T(c_{sp})$) the more accurately transformation T reflects the actual movement of the image capturing sensor, the more closely $c_{sp}'$ will equal $d_{sq}$.

Thus, the method proceeds to 240 with evaluating the quality of hypothesis H. Various means are known to those of ordinary skill in the art for determining the reprojection hypothesis quality. In one embodiment, a mean (squared) reprojection error of the features in the scene is determined for different hypotheses H and compared. In another embodiment, the quality of hypothesis H is determined from the relative number of inlier points that appear when the hypothetic transformation T is applied to either part of, or the entire feature set A. That is, in one embodiment, an A' is calculated using A'=T(A) and the similarity between A' and B is determined. The closer A' resembles B, the better the quality of H. The choice of a particular metric used to determine the quality of H for embodiments of the present invention is selected based on the specific projection type, type of features in the set A, and/or the transformation undergone; in general it allows the relative quality of different H's to be compared against each other. In one embodiment, each hypothesis H is stored into memory. The method then proceeds to 250 with storing a final hypothesis transformation $H_B$ into a memory device. The final transformation $H_B$ represents the best estimated hypothesis H based on the quality metric.

As shown at 260, blocks 210 to 240 are iteratively repeated each time finding at least one similar descriptive subset $d_{sq}$ in set B for every selected descriptive subset $c_{sp}$ from set A, and deriving from each resulting descriptive subset pair $[c_{sp}, d_{sq}]$ a hypothetic transformation $T\{c_{sp}, d_{sq}\}$, further forming the hypothesis $H\{c_{sp}, d_{sq}\}$, together with those features from sets C and D, that support this hypothetic transformation. As would be appreciated by one of ordinary skill in the art, general speaking, a process for repeatedly generating and testing hypotheses using evaluation by the other set members, as described in blocks 210-240 is sometimes referred to as a RanSaC estimation method. The $H\{c_{sp}, d_{sq}\}$ found from the iterations having the best quality as determined block 240 is stored into the memory device as $H_B$.

The method above produces two very useful products. The first product is an output in the form of the best hypothesis $H_B$ stored into the memory device. The final hypothesis $H_B$ defines a transformation $T_B$ that represent a best estimation of how an image sensor moved. As such, $T_B$ may be used to transform the features appearing in P1 into P2, or match features appearing in P1 with corresponding features in P2. In other words, an object identified in the first image can be identified and located in the second image using $H_B$. As an example, in case of 3D to 2D perspective projection (matching of camera images), by applying the best hypothetic transformation $T_B$ on A, any feature of set A will produce a projection A' and the number of those projections A' that line up with a epipolar lines belonging to corresponding features in set B will be maximized.

Figure 3:
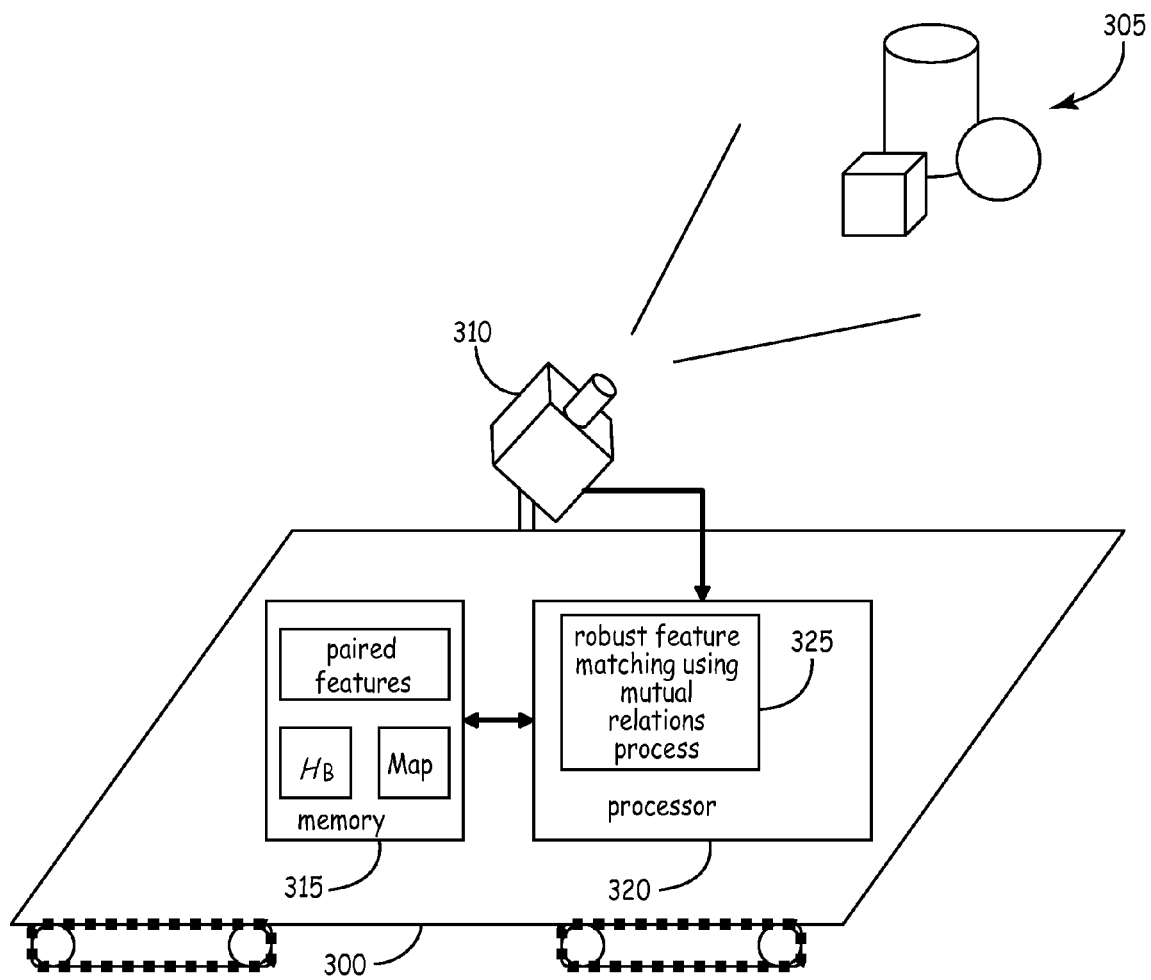
FIG. 3 is a block diagram illustrating one embodiment of the present invention.

In one embodiment, the solution for $H_B$ is applied to the practical field of self navigating vehicles. FIG. 3 is a block diagram illustrating one embodiment of the present invention. In this embodiment, a self navigating vehicle 300 includes an image capturing device 310 and a processor 320 implementing a robust feature matching using mutual relations process 325, such as described above with respect to FIG. 2.

In one embodiment, in operation, image capturing device 310 captures a first image of a real-world scene 305. In one embodiment, vehicle 300 has at least approximate knowledge of its own coordinates with respect to the reference frame of the real-world scene 304 as it captures the first image. Vehicle 300 subsequently travels to a second location and captures a second image of the real-world scene 305. From the first and second image, processor 320 calculates and stores into memory 315 a final hypotheses $H_B$ In one embodiment, vehicle 300 then determines coordinates for its new position by applying the transformation $T_B$ belonging to the best hypothesis $H_B$ to its coordinates in the navigation frame. The difference in coordinates can also be used to determine vehicle parameters such as, but not limited to, vehicle 300's velocity (when time between image captures is known), heading, and orientation (i.e., yaw, pitch and roll). In another embodiment, vehicle 300 applies the transformation $T_B$ belonging to final hypotheses $H_B$ to known obstacles previously identified in the first image to estimate the relative position of those objects at its new location, even when those particular objects do not appear in the second image. As this suggests, it is not necessary for the two images used for determining hypotheses $H_B$ to be completely overlapping images of a scene, as long as common features can be extracted from the two images. It is also not necessary for the two images used for determining hypotheses $H_B$ to be sequentially taken. Images taken minutes, hours, days or years apart can be processed against current images as long as the images are at least overlapping images of a relatively static scene 305. Further, it is not necessary for the images to be captured by the same image capturing device 310. Images captured from multiple image capturing devices can be used as long as they implement the same transformation when capturing the scene into a projection. Also, the two projections for which the feature matching is desired do not have to be captured by the same capturing device at two times, but equivalently by two or more devices at the same time or some may be generated from the apriori known data.

In another embodiment, in operation, image capturing device 310 captures an image of a real-world scene 305. Using apriori given map of features, the processor 320 calculates a match between features from the image and features in the map. The final hypothesis $H_B$ then defines the position of the vehicle 300 in the navigation reference frame aligned with the map.

In another embodiment, the solution of $H_B$ is readily applied to the field of automated map building using vehicle 300 or to obtain the matching feature pairs (or larger sets) for triangulation or reprojection purposes, such as for the 3D stereoscopic reprojection. For example, with alternate embodiments of the present invention, static features identified in one image projection can be correlated to similar features identified in a second image projection in order to combing the two images into a third image that preserves information regarding the relative position of objects in the two images. By repeating this process, as vehicle 300 travels, a map is developed and saved into memory 315 that can serve for various purposes, it might be used, for example, to identify pathways that can be traversed without hindrance from obstacles or it might serve for navigation of other vehicles, etc. Similarly, in other embodiments, the processor 320 applies robust feature matching using mutual relations process 325 to create a mosaic image in memory 315 from separate captured images, by overlapping correlating features from feature set A and onto feature set B.

The second useful product stored into the memory is the set of paired features from respective feature sets A and B that explain the hypotheses $H_B$. That is, for each feature of set A that was extracted from a first projection, the process 325 above identifies a corresponding member in feature set B which is linked through a transformation defined by the final hypotheses $H_B$. These pairs are also stored in memory 315. To the degree hypotheses $H_B$ is correct, features of set A, and those features of transformed hypotheses $H_B$, represent the same features of the same physical objects from real world scene 305. These corresponding members define member pairs which can readily be used to take a particular feature from the first projection and identify where that feature exists in the second projection. Similarly, these corresponding members can be used to confirm that a physical arrangement of objects in a current image corresponds to a physical arrangement of objects obtained in a previous image using a least squares fit (or similar evaluation) based on the member pairs. For those members of the two feature sets that mutually supported the best hypothesis, a common solution for the transformation T can be enumerated by a least-squares method or other over-determined system parameter estimator.

Several means are available to implement the systems and methods of the current invention as discussed in this specification. These means include, but are not limited to, digital computer systems, microprocessors, general purpose computers, programmable controllers and field programmable gate arrays (FPGAs). For example, in one embodiment, a processor 320 is implemented within vehicle 300 by an FPGA. In one embodiment, that FPGA is programmed to carry out robust feature matching using mutual relations process 325 by executing an algorithm that implements the method of FIG. 2.

Therefore other embodiments of the present invention are program instructions resident on computer readable storage media devices which when implemented by such means enable them to implement embodiments of the present invention. Computer readable storage media devices include any form of a physical computer memory device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A non-transitory computer readable media device having computer-executable instructions for a method for matching image features, the method comprising:
   defining a first descriptive subset of features, including at least one minimal subset, from a feature set A extracted by at least one processor from a first image projection;
   selecting at least two second descriptive subsets from a feature set B extracted by the at least one processor from a second image projection, the at least two second descriptive subsets correlated to at least two minimal subsets, which meet a congruency criteria with the first descriptive subset of features from the feature set A, wherein the at least two second descriptive subsets are selected based on a similarity of invariant mutual relations between features of one of the at least one minimal subset in the first descriptive subset and invariant mutual relations between features of the at least two minimal subsets in the at least two second descriptive subsets, wherein the first descriptive subset and the at least two second descriptive subsets define at least two pairs of similar descriptive subsets;
   calculating at the at least one processor a transformation T from at least one of the at least two pairs of similar descriptive subsets to form a hypothesis H;
   evaluating at the at least one processor a quality of the hypothesis H;
   storing the hypothesis H into a memory device, the hypothesis H including transformation T and a plurality of paired features that support the hypothesis H; and
   selecting a final hypothesis $H_B$ having a highest quality as determined by a quality metric, the method further comprising at least one of:
      determining coordinates for a new position by applying the transformation T belonging to the selected final hypothesis $H_B$ to coordinates in a navigation frame; and
      generating a map in the memory device for navigating a vehicle, the map based on matching features from the first image projection with the second image projection.

2. The non-transitory computer readable media device of claim 1, the method further comprising:
   defining a plurality of descriptive subsets of features from the feature set A;
   for each of the plurality of descriptive subsets from the feature set A, selecting at least two descriptive subsets from the feature set B based on a similarity of invariant mutual relations between features to form a plurality of similar descriptive subset pairs;
   calculating a hypothetic transformation T for each of the plurality of similar descriptive subset pairs to form at least one hypothesis H; and
   storing into memory a plurality of paired features that support the final hypothesis $H_B$, where this plurality of paired features each include a feature from the feature set A and a feature from the feature set B.

3. The non-transitory computer readable media device of claim 2, the method further comprising determining a distance to an object based on a best transformation $T_B$ and plurality of paired features that support the final hypothesis $H_B$.

4. The non-transitory computer readable media device of claim 1, the method further comprising:
  determining a number n of features to include in the first descriptive subset based on a type of projection utilized in an image sensor to generate the first image projection from a real-world scene; and
  an anticipated transformation undergone between the first image projection and the second image projection.

5. The non-transitory computer readable media device of claim 1, wherein similarity is determined by estimating using one or both of variances and co-variance of invariant properties.

6. The non-transitory computer readable media device of claim 1, wherein selection of the first descriptive subset is based on one of a random, a pseudorandom, a quasi-random, or a deterministic process.

7. The non-transitory computer readable media device of claim 1, the method further comprising calculating a solution for transformation T from a plurality of paired features that support the final hypothesis $H_B$ using an over determined system parameter estimator.

8. The non-transitory computer readable media device of claim 1, the method further comprising:
  calculating a match between features from a captured image and a map of features stored in the memory device; and
  defining a position and an orientation from the final hypothesis $H_B$.

9. The non-transitory computer readable media device of claim 1, wherein the invariant mutual relations between features include at least one of a set of invariant mutual relations including a distance, an area, an angle, a solid angle, a volume, a generalized area or volume to higher dimensions, a central moment or a histogram.

* * * * *